Patented Nov. 7, 1933

1,933,986

UNITED STATES PATENT OFFICE 1,933,986

CONDENSATION PRODUCT OF POLYVINYL ALCOHOL WITH CYCLIC KETONES AND A PROCESS OF PREPARING IT

Georg Kränzlein and Arthur Voss, Frankfort-on-the-Main-Hochst, and Werner Starck, Hofheim in Taunus, Germany, assignors to I. G. Farbenindustrie Aktiengesellschaft, Frankfort-on-the-Main, Germany No Drawing. Application December 11, 1931, Serial No. 580,490, and in Germany December 27, 1930

14 Claims. (Cl. 260—2)

The present invention relates to condensation products of polyvinyl alcohol with cyclic ketones and a process of preparing them.

We have found that condensation products can be made by causing a cyclic ketone to act upon a polyvinyl alcohol in the presence of a condensation catalyst of acid reaction. The condensation products thus obtained are soluble in organic solvents and/or in water. Instead of starting in this process from a polyvinyl alcohol, there may also be used a polyvinyl ester as starting material, but the conditions of working must be such that the corresponding polyvinyl alcohols are intermediately formed, that is to say there must be present a polyvinyl alcohol formed in situ. As acid catalysts, known to promote condensations there may be used strong acids, such as sulfuric acid, hydrochloric acid, phosphoric acid, monochloracetic acid, dichloracetic acid, borofluoro-acetic acid, oxalic acid, formic acid, lactic acid, an aromatic sulfonic acid; also zinc chloride, aluminium chloride. The reaction may occur at a temperature between about 0° C. and 100° C. As cyclic ketones, that is ketones which have a C=O group as a member of the ring, there may be used for instance: cyclohexanone, 2-methylcyclohexanone, 3-methylcyclohexanone, 4-ethylcyclohexanone, 4-chlorocyclohexanone, α-oxo-tetrahydro-naphthalene of the following formula:

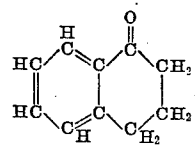

The amorphous products obtained according to the new process are distinguished not only by their solubility already mentioned but particularly by a high elasticity, absence of color in the lacquers made from them and a high resistance to chemical or physical action. These products can be used for various industrial purposes and are, therefore, of great value.

The following examples serve to illustrate the invention, but they are not intended to limit it thereto, the parts being by weight:

(1) 100 parts of polyvinyl alcohol are heated to 80° C. in a reflux apparatus, while stirring, together with a mixture of 250 parts of alcohol, 250 parts of benzene, 130 parts of α-methyl-cyclohexanone and 2 parts of concentrated sulfuric acid. After 2-3 hours, solution is complete. The product may be obtained in the form of a finley pulverized, white powder by distilling the solvent in steam, washing the residue and drying it under reduced pressure. It is insoluble in water and soluble in hydrocarbons and other organic solvents.

The formula of this condensation product cannot yet be wholly ascertained; the reaction may, however, proceed according to the following equation:

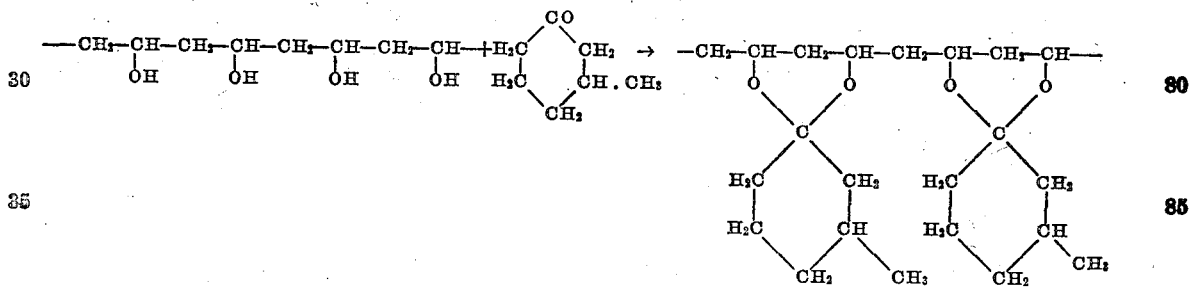

(2) 200 parts of polyvinyl acetate are dissolved in 1800 parts of alcohol, 10 parts of concentrated sulfuric acid and 220 parts of cyclohexanone are added thereto and the solution is heated to 80° C., while stirring. After 10 hours, the saponification of the acetyl residue and the simultaneous acetalization with cyclohexanone are complete. The product may be obtained in the form of a white powder by precipitating it with water, eliminating the acid by washing the precipitate and drying the latter under reduced pressure. The powder thus obtained is soluble in organic solvents, but insoluble in water. It may be used as a crude substance for making lacquers and moulding compositions. Instead of concentrated sulfuric acid, there may be added 12 parts of concentrated hydrochloric acid as a catalyst.

The reaction probably proceeds according to the following equation:

a partial saponification of polyvinyl acetate, which polyvinyl alcohol still contains about half of the acetyl groups, are introduced, while stirring, into a mixture of 400 parts of alcohol, 120 parts of α-oxo-tetra-hydronaphthalene and 5 parts of concentrated sulfuric acid. The mass is heated during 6–7 hours to 80° C., while stirring

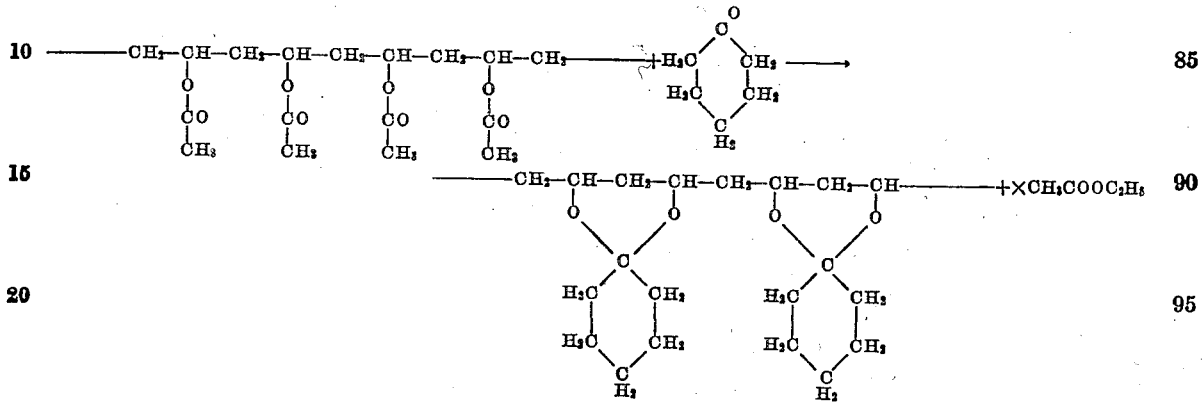

(3) 100 parts of polyvinyl alcohol are dissolved in 900 parts of water. The solution is mixed with 5 parts of concentrated sulfuric acid and 22 parts of cyclohexanone and stirred for 6 hours at 90° C. The reaction is then complete. The product is still soluble in water and slightly capable of swelling in alcohol. It may be obtained in the form of a colorless powder by precipitating it with acetone and drying it under reduced pressure. In the form of an aqueous solution, it can be used as an auxiliary agent in the textile industry. Instead of the concentrated sulfuric acid, there may be added 12 parts of concentrated hydrochloric acid as a catalyst.

The reaction probably proceeds according to the following equation:

well. The solution becomes more viscous due to the progress of the acetalization. The acetalization occurs more quickly than the further separation of the acetyl residues. By precipitating and washing the product with water, there is obtained a white powder which is sparingly soluble in most of the organic solvents and more readily soluble in mixtures of organic solvents such as alcohol and benzene. The product is suitable for the manufacture of artificial materials.

Instead of the sulfuric acid, there may be used 2.5 parts of borofluoro-acetic acid.

(6) 100 parts of polyvinyl alcohol are introduced in small amounts at 0° C. into 900 parts of sulfuric acid of 60 per cent. strength, while well

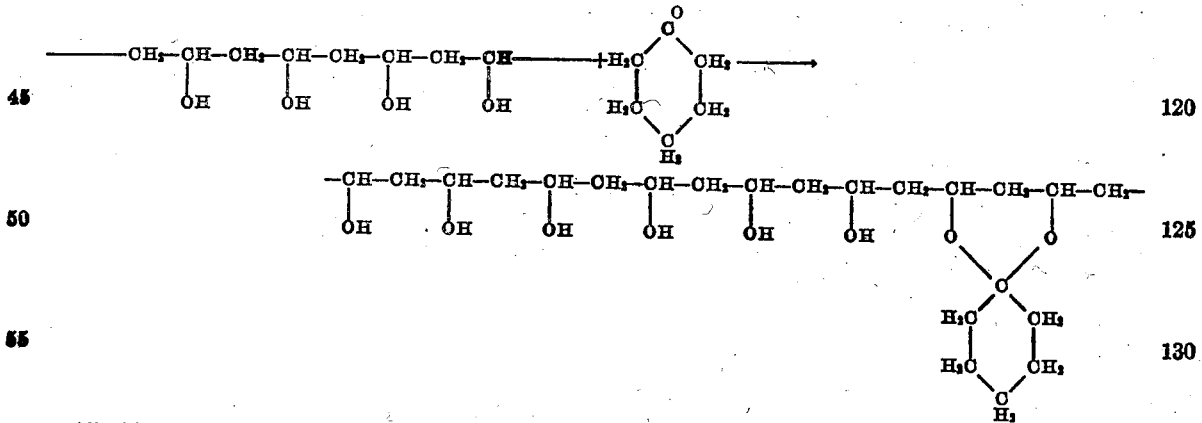

(4) 140 parts of polyvinyl butyrate are introduced, while stirring, into a mixture of 400 parts of alcohol, and 170 parts of para-chlorocyclohexanone. After formation of a fairly homogeneous and viscous mass, 5 parts of concentrated sulfuric acid, diluted with 10 parts of water, are added and the mass is then kept during about 6 hours at 80° C., while stirring continuously. The solution becomes clear and homogeneous. By precipitation and washing with water, there is obtained a white powder which is sparingly soluble in alcohol, acetone, or hydrocarbons such as benzene, but readily soluble in chlorinated hydrocarbons. The product can be used for the manufacture of lacquers and moulding compositions.

(5) 100 parts of a polyvinyl alcohol, obtained by stirring. After 2 hours 110 parts of cyclohexanone are added to the homogeneous solution, while stirring, and the mixture is then kept at 0° C. during 12–14 hours, while stirring well. The condensation is now complete. In order to precipitate the product, 2 liters of ice water are added. The product obtained in the form of white flakes is washed with water in a suction apparatus provided with stirrers until no acid is any longer to be found. After the condensation product has been dried under reduced pressure at 40° C.–50° C., it is capable of swelling in benzene and similar solvents. It can be used for the manufacture of moulding compositions.

We claim:

1. The process which comprises causing a cyclic ketone to act upon a polyvinyl alcohol in the presence of an acid condensation catalyst.

2. The process which comprises causing a cyclic ketone to act upon a polyvinyl alcohol in the presence of an acid condensation catalyst at a temperature between about 0° C. and about 100° C.

3. The process which comprises causing a cyclic ketone to act upon a polyvinyl alcohol formed in situ in the presence of an acid condensation catalyst.

4. The process which comprises causing a cyclic ketone to act upon a polyvinyl alcohol formed in situ in the presence of an acid condensation catalyst at a temperature between about 0° C. and about 100° C.

5. The process which comprises causing a cyclic ketone to act upon a polyvinyl alcohol in the presence of a strong mineral acid at a temperature between about 0° C. and about 100° C.

6. The process which comprises causing a monocyclic ketone to act upon a polyvinyl alcohol in the presence of a strong mineral acid at a temperature between about 0° C. and about 100° C.

7. The process which comprises causing α-methylcyclohexanone to act upon a polyvinyl alcohol in the presence of concentrated sulfuric acid at a temperature between about 0° C. and about 100° C.

8. The process which comprises causing cyclohexanone to act upon a polyvinyl alcohol in the presence of concentrated surfuric acid at a temperature between about 0° C. and about 100° C.

9. The process which comprises causing para-chlorocyclohexanone to act upon a polyvinyl alcohol formed in situ in the presence of concentrated sulfuric acid at a temperature between about 0° C. and about 100° C.

10. As a new product the condensation product of a polyvinyl alcohol and a cyclic ketone said product being colorless, amorphous, soluble in organic solvents and showing a high elasticity and a high resistance to chemical and physical actions.

11. As a new product the condensation product of a polyvinyl alcohol and a monocyclic ketone said product being colorless, amorphous, soluble in organic solvents and showing a high elasticity and a high resistance to chemical and physical actions.

12. As a new product the condensation product of a polyvinyl alcohol and α-methylcyclohexanone said product being an amorphous white powder, soluble in hydrocarbons and other organic solvents and showing a high elasticity and a high resistance to chemical and physical actions.

13. As a new product the condensation product of a polyvinyl alcohol and cyclohexanone said product being an amorphous white powder, soluble in organic solvents and showing a high elasticity and a high resistance to chemical and physical actions.

14. As a new product the condensation product of a polyvinyl alcohol and para-chloro-cyclohexanone said product being an amorphous white powder, soluble in chlorinated hydrocarbons and showing a high elasticity and a high resistance to chemical and physical actions.

GEORG KRÄNZLEIN.
ARTHUR VOSS.
WERNER STARCK.